US008938821B2

(12) United States Patent  (10) Patent No.: US 8,938,821 B2
Higgins  (45) Date of Patent: Jan. 27, 2015

(54) COUPLER FOR IMPROVED FLOW TO AN EXTERNAL DRAIN

(75) Inventor: Michael Higgins, La Habra Heights, CA (US)

(73) Assignee: Falcon Waterfree Technologies, LLC, Los Angeles, CA (US)

( * ) Notice: Subject to any disclaimer, the term of this patent is extended or adjusted under 35 U.S.C. 154(b) by 813 days.

(21) Appl. No.: 11/184,547

(22) Filed: Jul. 18, 2005

(65) Prior Publication Data

US 2008/0093845 A1  Apr. 24, 2008

Related U.S. Application Data

(60) Provisional application No. 60/588,949, filed on Jul. 19, 2004.

(51) Int. Cl.
*E03D 13/00* (2006.01)
*F16L 47/12* (2006.01)
(Continued)

(52) U.S. Cl.
CPC .............. *F16L 47/12* (2013.01); *E03C 1/122* (2013.01); *E03D 11/13* (2013.01); *F16L 23/0286* (2013.01); *F16L 33/08* (2013.01)
USPC .......................................................... 4/301

(58) Field of Classification Search
USPC .............. 4/301, 300, 321, 315, 428, 458, 4/252.1–252.6, 671–674, 679, 680, 4/DIG. 7; 285/58, 179, 182, 180, 300, 285/298; 138/111, 39
See application file for complete search history.

(56) References Cited

U.S. PATENT DOCUMENTS 368,508 A * 8/1887 Bishop ..................... 285/148.12
2,845,631 A * 8/1958 Kozlowski et al. ............ 4/252.1
(Continued)

FOREIGN PATENT DOCUMENTS

CH  495 524 A  8/1970
GB  2 283 796 A  5/1995

*Primary Examiner* — Huyen Le
*Assistant Examiner* — Janie Christiansen

(57) ABSTRACT

A bushing (58) has an entry portion (68) which is secured to a urinal housing (50) and an exit portion (70) which faces a drain pipe (54, 54a, 54b). The entry portion interior surface (74) is fittable about and sealingly grips the urinal exit tube (52). The interiors of the entry and exit portions lie on a common axis (58x) and with the axis (52x) of the urinal exit tube. These axes define a sloped incline and, thus, a built-in, gravitationally-directed downwardly-disposed inclination. Because the axes usually do not fall on the axis (56x) of the conduit, they are angled and offset from the conduit axis. The offset of the bushing raises it above the axis of the conduit. Tubing (60, 60a) is secured at its end (62, 62a) to the bushing exit portion so that the tubing axis at its end (62, 62a) similarly is raised above the conduit axis. The tubing extends from the bushing at an incline that is determined by the built-in incline of the bushing. This tubing is smaller in its outer diameter than the inner diameter of the conduit so that the tubing can pass through the conduit and into the drain pipe. The interior surface (74) of the bushing is offset from its outer surface which is secured to the conduit. Thus, the tubing is allowed to ensure that the conduit will not so contact the tubing as to deleteriously affect the downward inclination of the tubing. An orientation indicator tab (92) on the bushing ensures that its inclined orientation is properly positioned vis-a-vis the conduit. The exterior surfaces of the bushing are designed to enable it to fit within a variety of conduits, to accommodate new and existing connections such as flanges and hardware associated with the drain pipe, to ensure its durability, and to otherwise enable retrofitting to new and existing installations.

26 Claims, 11 Drawing Sheets

(51) Int. Cl.
  *E03C 1/122* (2006.01)
  *E03D 11/13* (2006.01)
  *F16L 23/028* (2006.01)
  *F16L 33/08* (2006.01)

(56) References Cited

U.S. PATENT DOCUMENTS

| | | | |
|---|---|---|---|
| 3,496,959 A * | 2/1970 | Wolfe et al. | 137/899 |
| 3,730,228 A * | 5/1973 | Gibbs, Sr. | 4/321 |
| 4,224,702 A * | 9/1980 | Bretone, Jr. | 4/252.1 |
| 4,546,789 A | 10/1985 | Taylor | 137/245.5 |
| 4,650,224 A * | 3/1987 | Smith | 285/302 |
| 5,667,251 A * | 9/1997 | Prest | 285/396 |
| 5,711,037 A * | 1/1998 | Reichardt et al. | 4/301 |
| 5,819,326 A * | 10/1998 | Kobayashi et al. | 4/252.1 |
| 5,904,183 A * | 5/1999 | Leech | 138/110 |
| 6,052,839 A * | 4/2000 | Teskey | 4/252.5 |
| 6,425,411 B1 * | 7/2002 | Gorges | 137/247.39 |
| 6,792,628 B1 * | 9/2004 | Humphrey | 4/300 |
| 6,973,939 B2 * | 12/2005 | Gorges et al. | 4/144.1 |
| 7,415,992 B2 * | 8/2008 | Kilroy | 138/114 |
| 2004/0134534 A1 * | 7/2004 | Gorges et al. | 137/247.13 |
| 2004/0181861 A1 * | 9/2004 | Inglin et al. | 4/144.1 |
| 2006/0101565 A1 * | 5/2006 | Cummings | 4/309 |

* cited by examiner

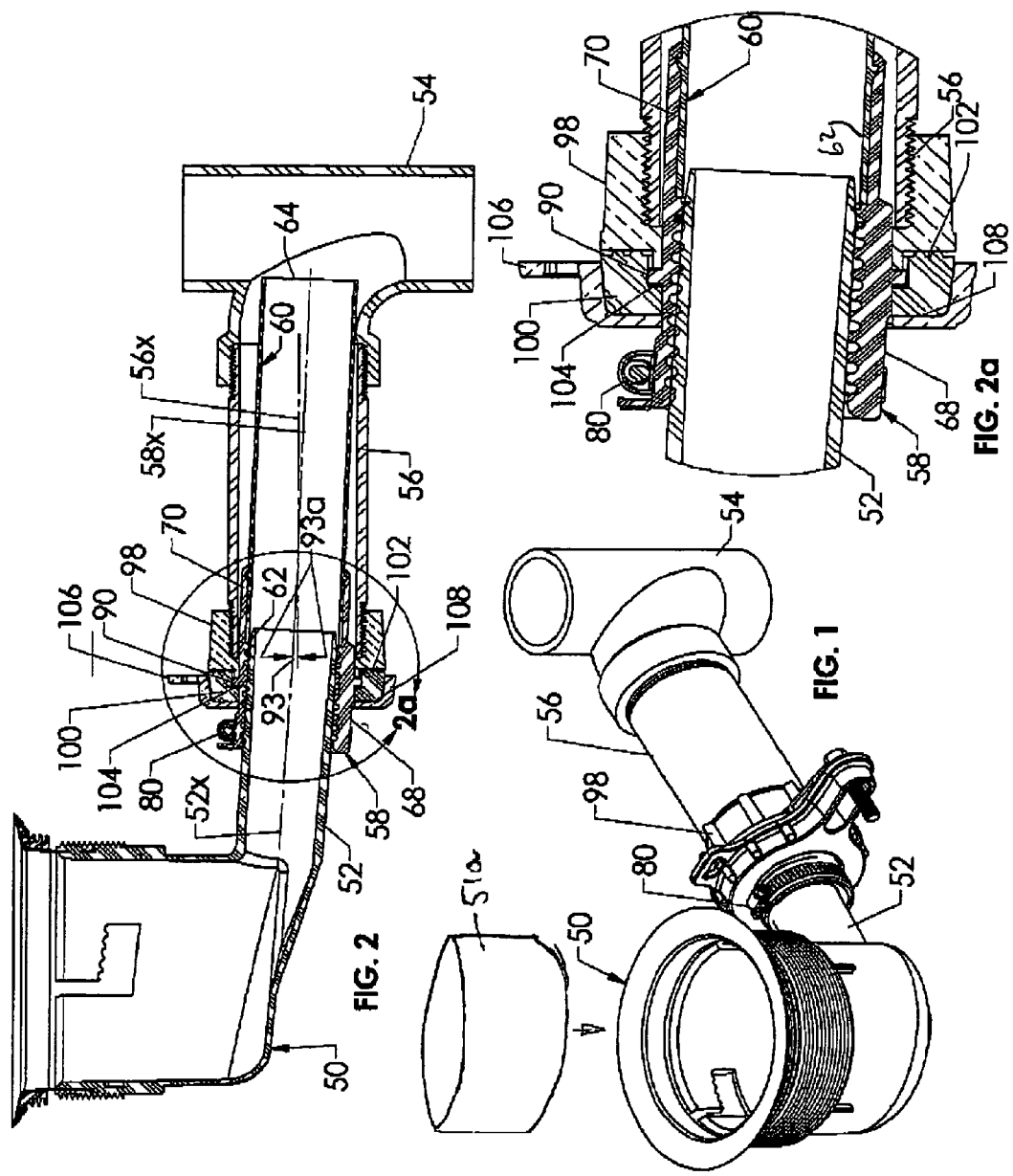

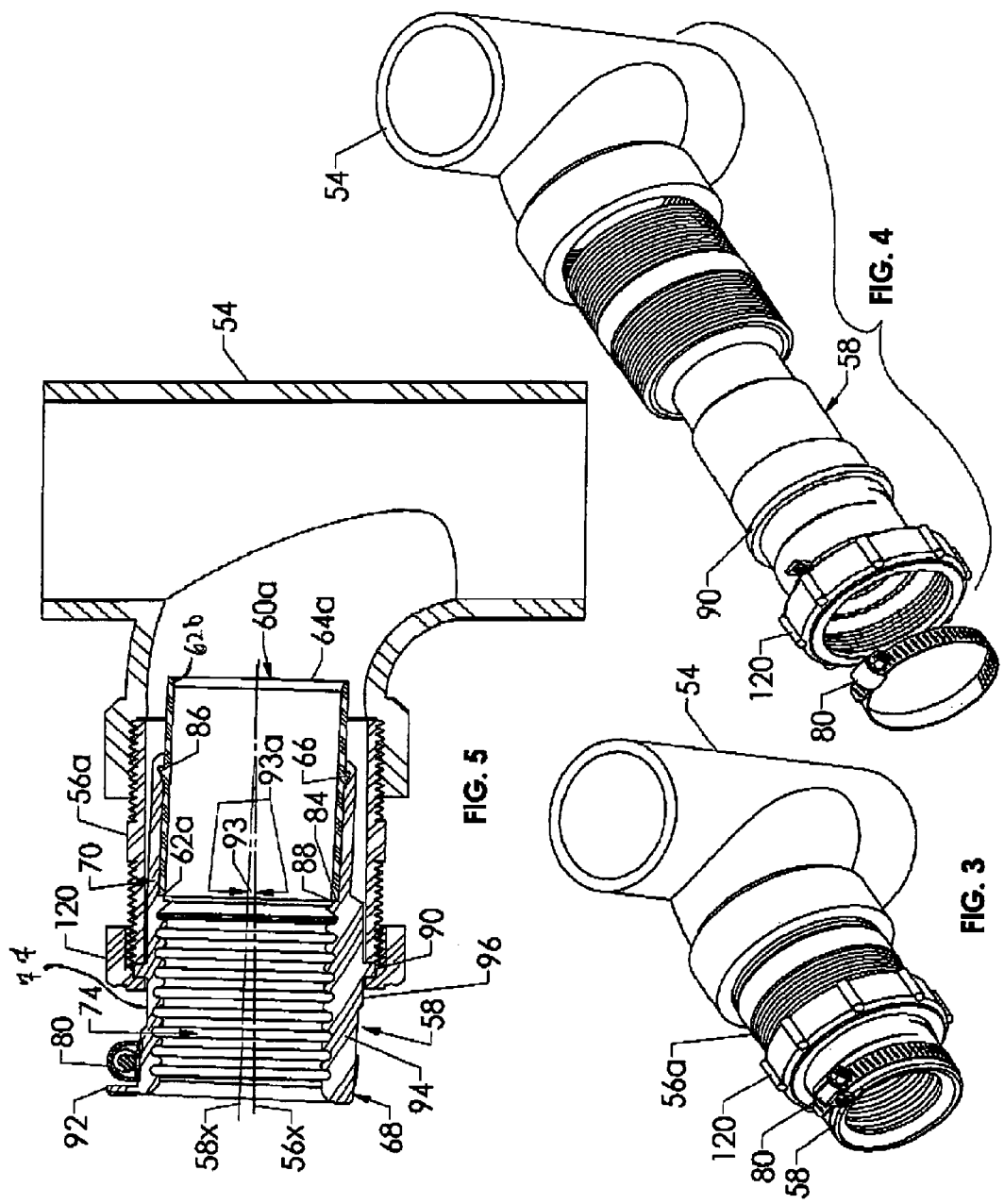

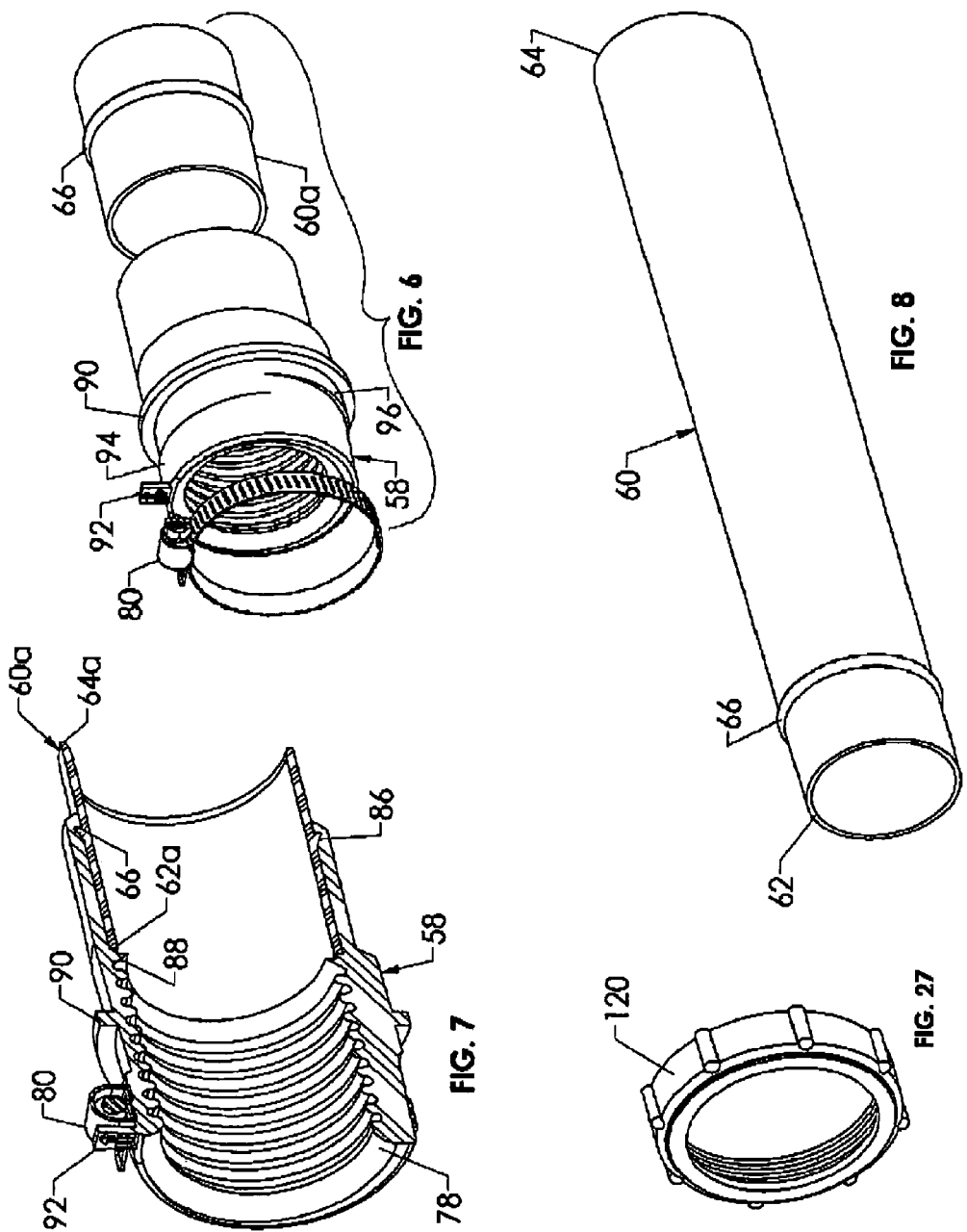

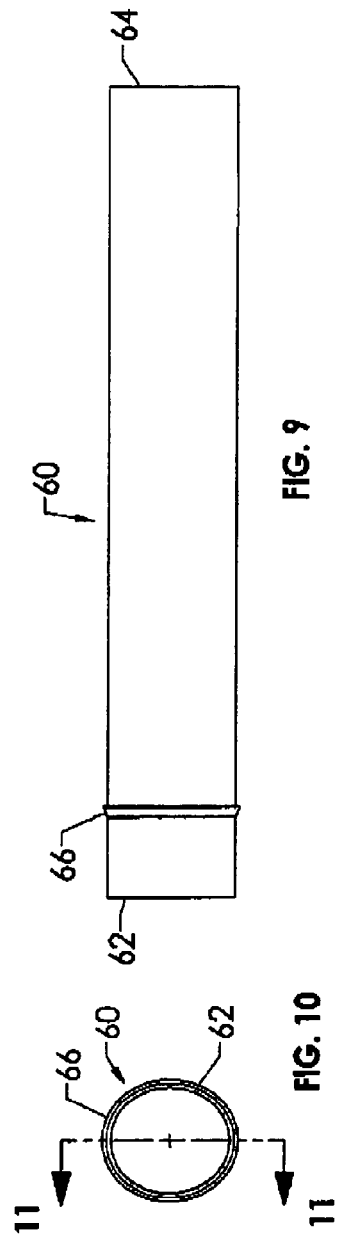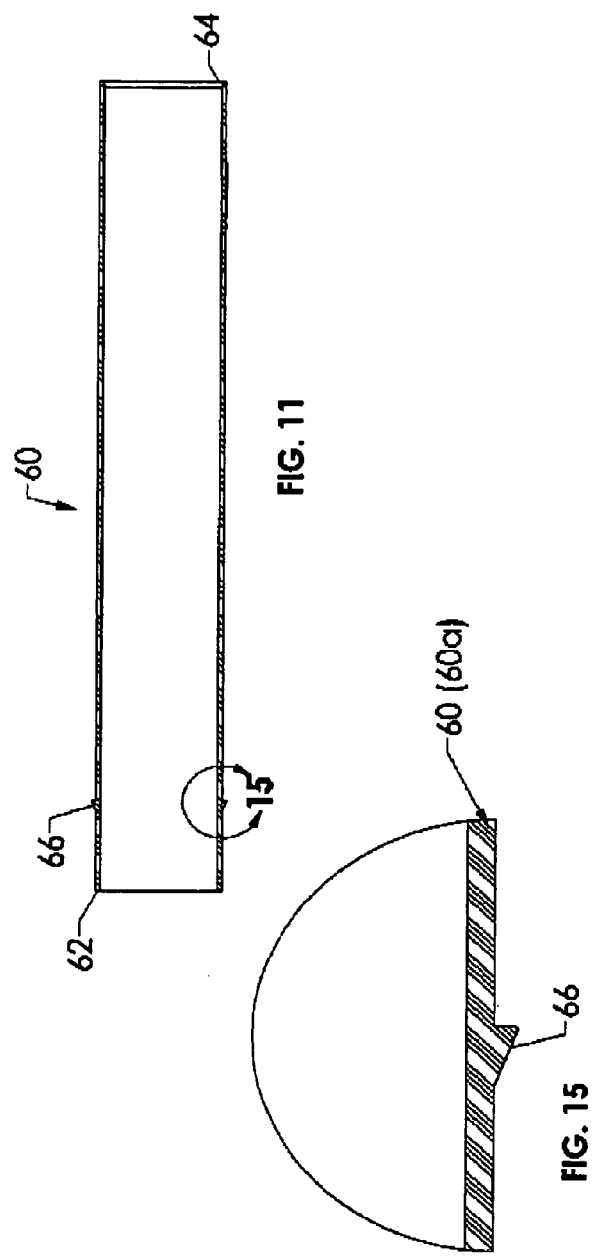

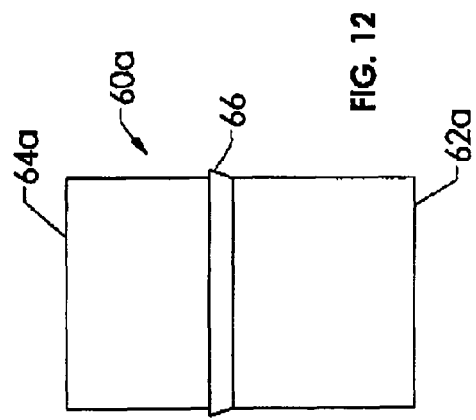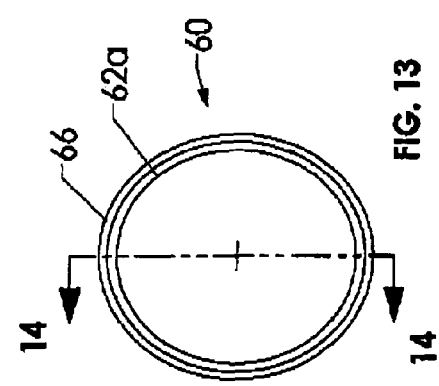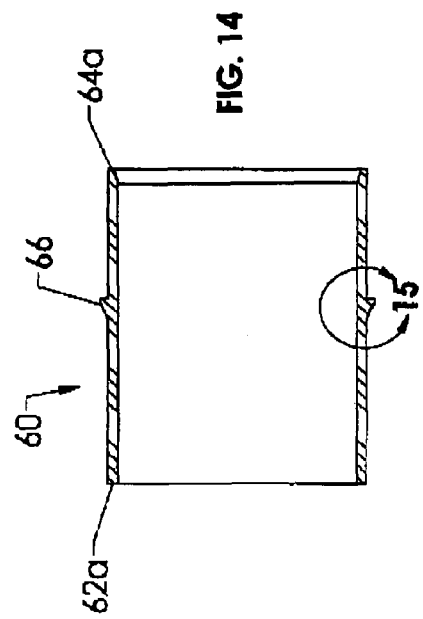

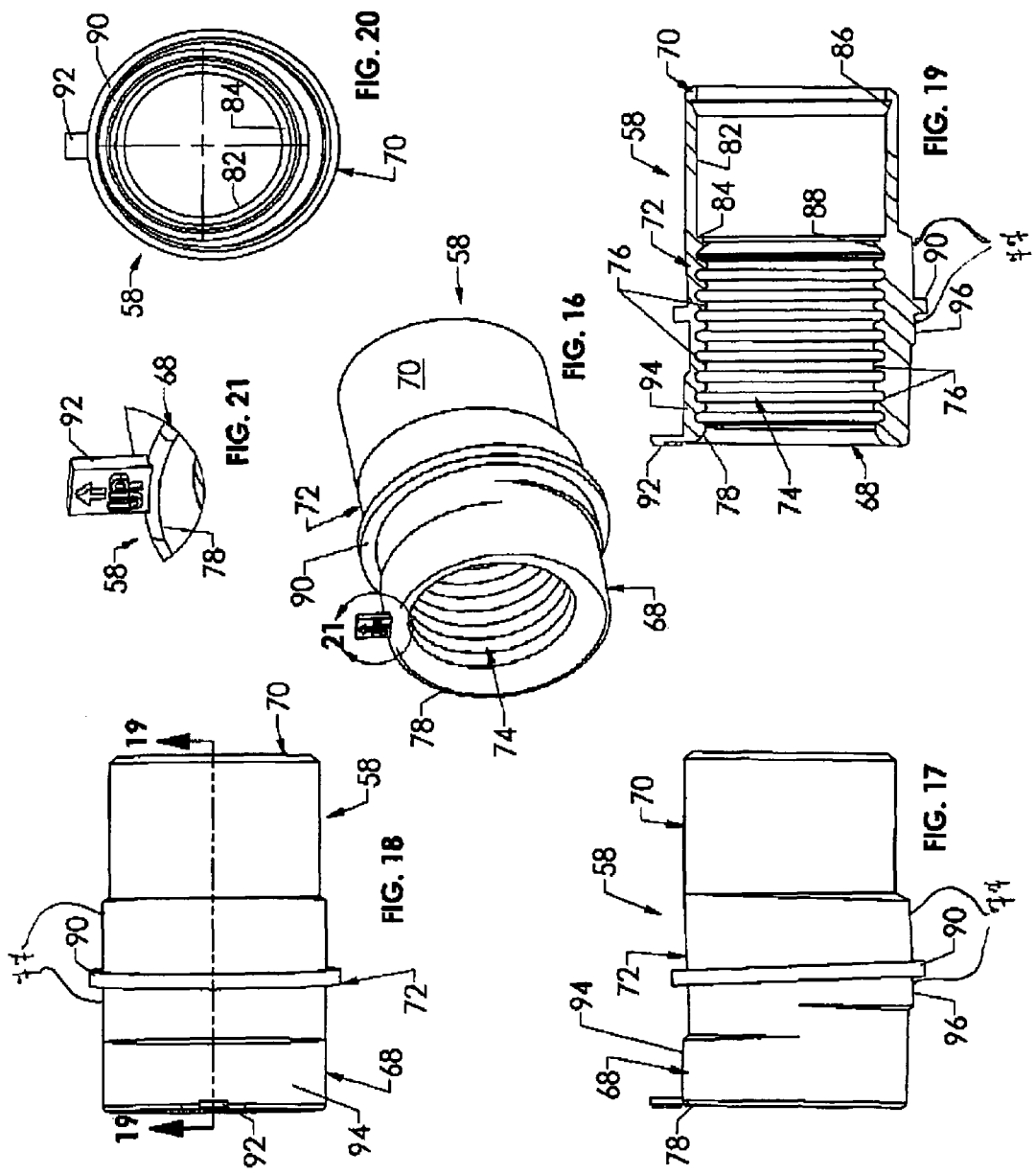

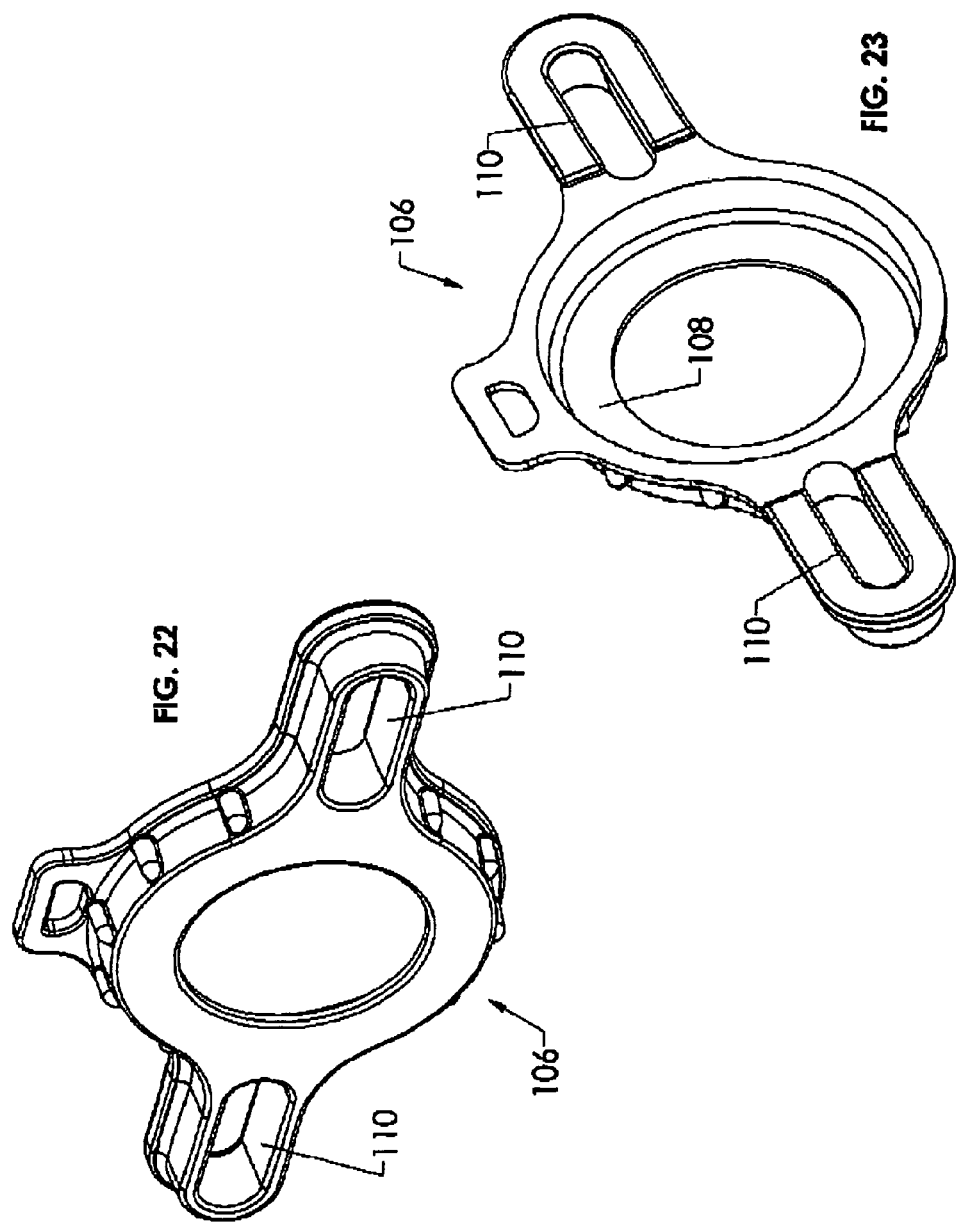

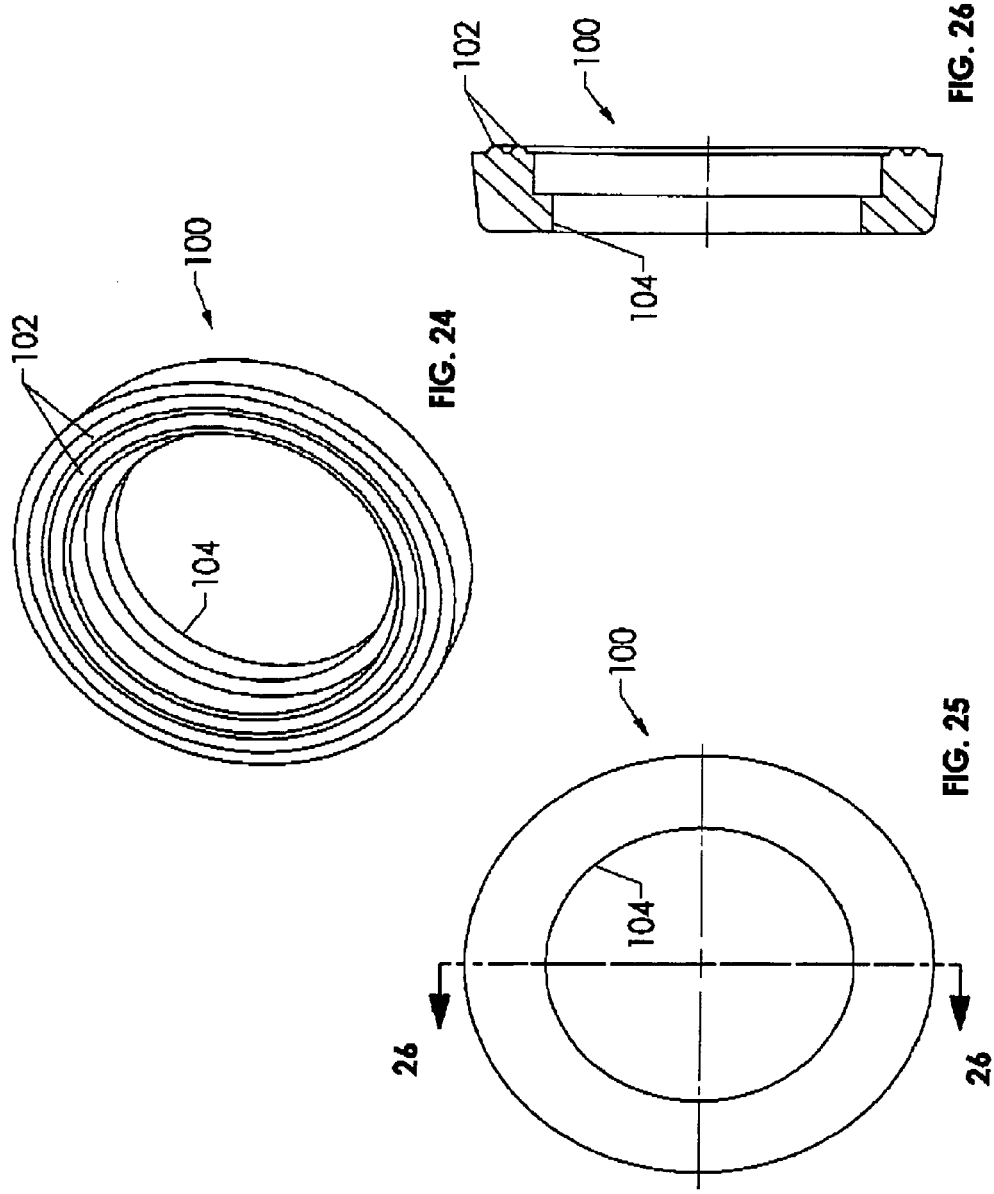

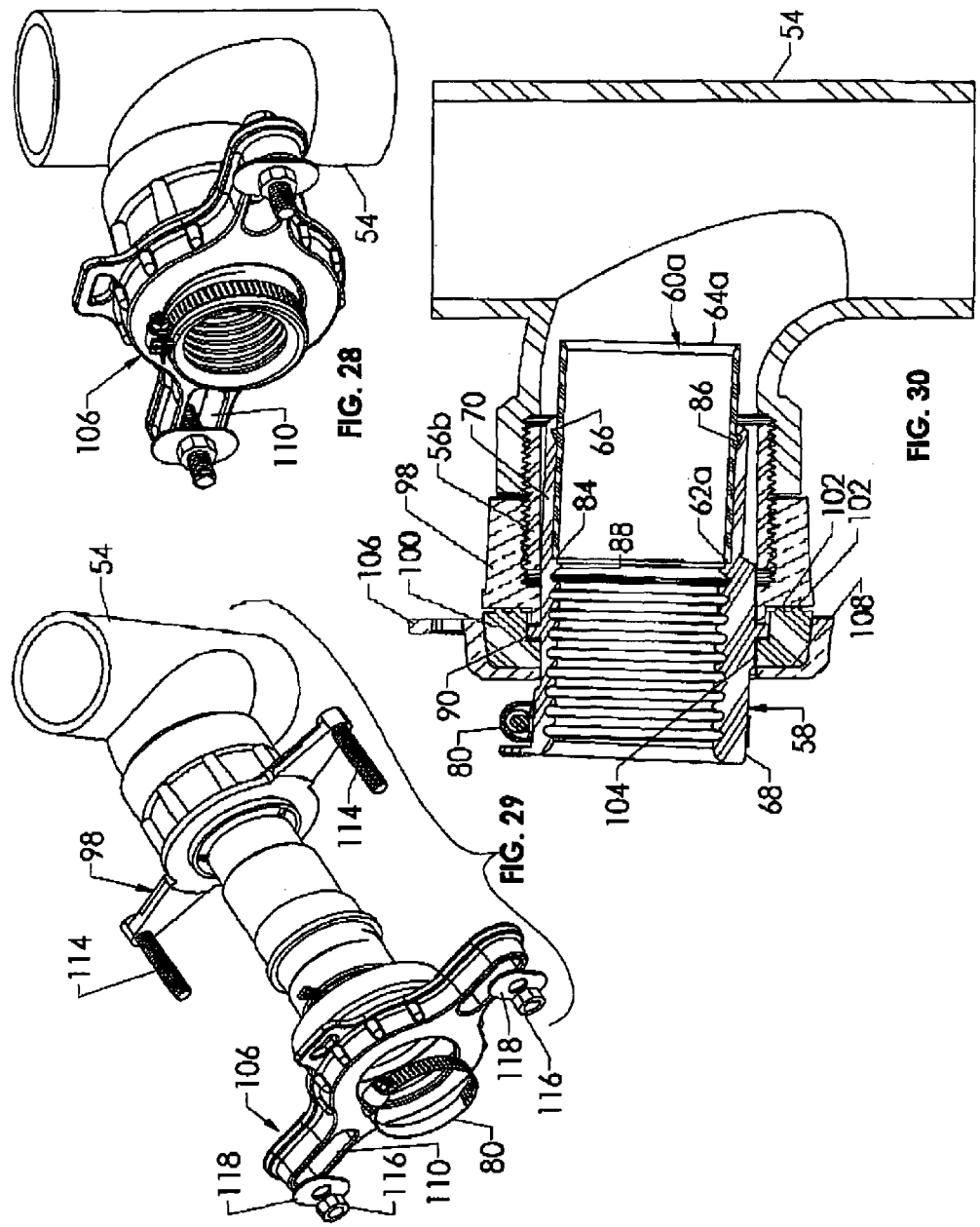

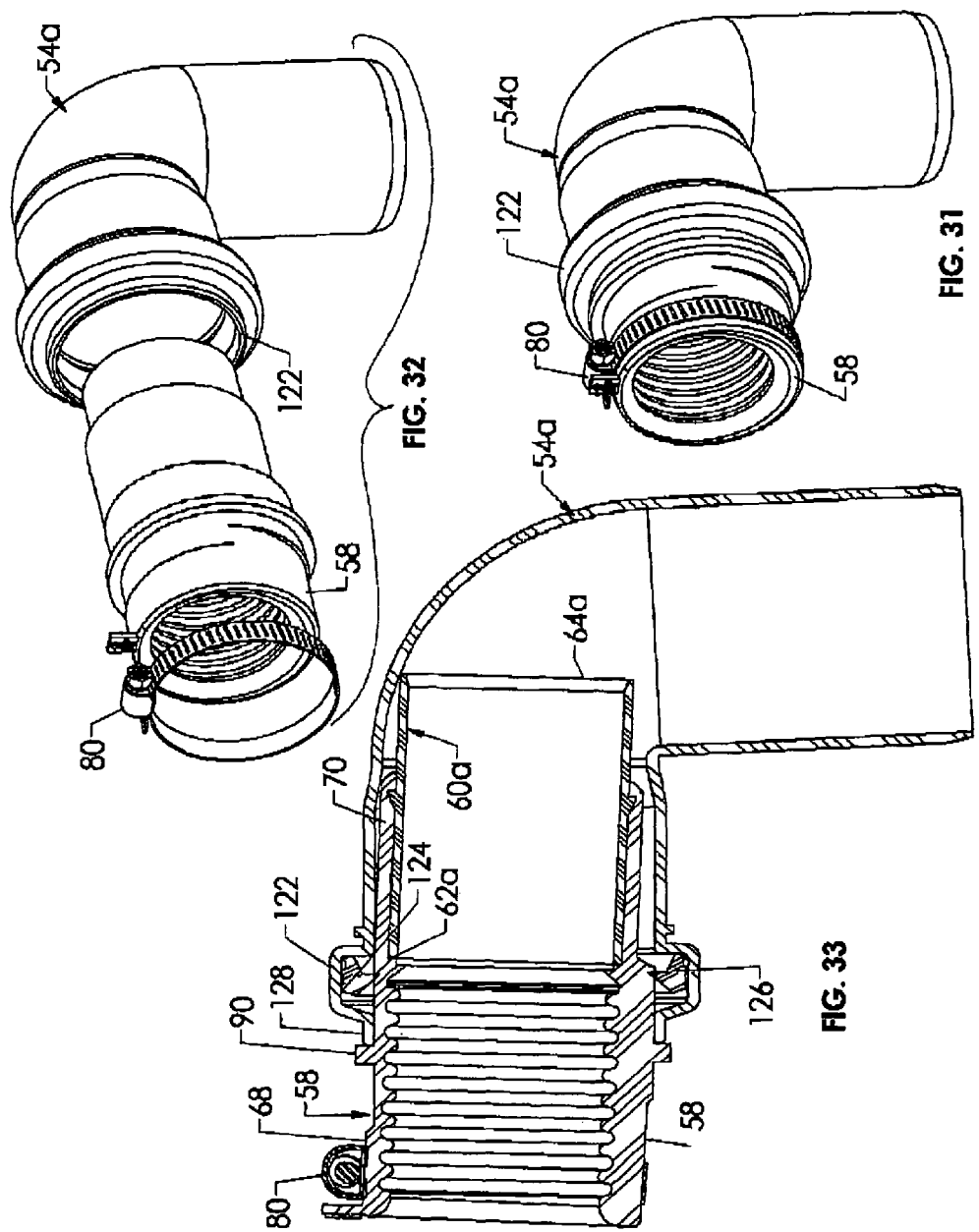

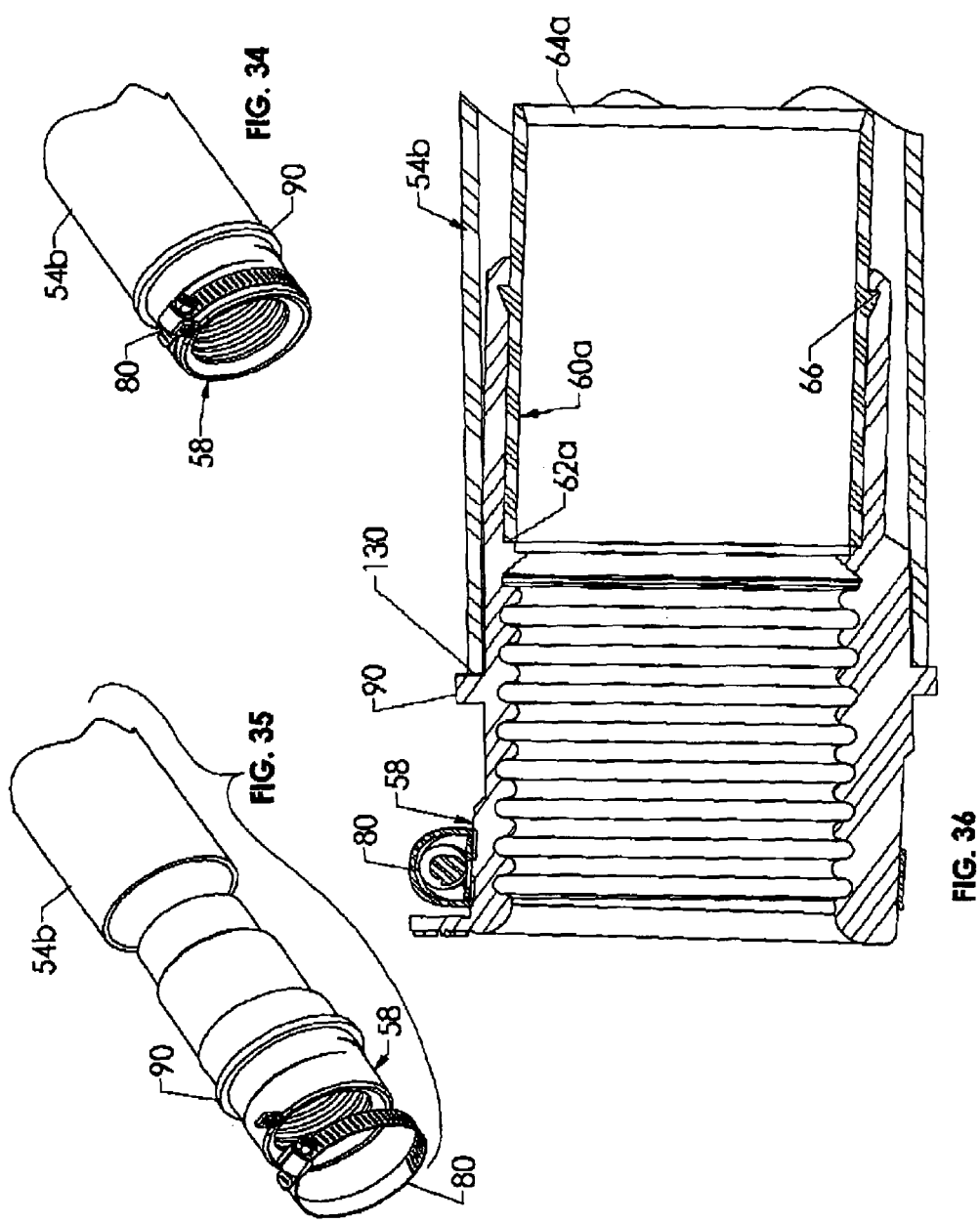

COUPLER FOR IMPROVED FLOW TO AN EXTERNAL DRAIN

CROSS-REFERENCE TO RELATED APPLICATION

This application claims the benefit, and is a continuation-in-part of U.S. Provisional Application No. 60/588,949 filed 19 Jul. 2004.

REFERENCE REGARDING FEDERAL SPONSORSHIP

Not Applicable

REFERENCE TO MICROFICHE APPENDIX

Not Applicable

1. Field of the Invention

The present invention relates to a coupling that enables a continuous liquid flow path to be provided to an external drain and, in particular, to a universal coupling that ensures that the flow of liquid to the external drain moves smoothly without significant or undue impedance, or without forming a pool within the coupling. In its preferred use, the flow path is to enable liquid waste and any solids carried by the liquid to be conducted from such devices as cartridges used in water-free urinals to the external drain.

2. Description of Related Art and Other Considerations

In a liquid flow path, such as through a conduit from a water-free urinal to an external drain pipe, it has been observed that, if the path is less than in a sufficiently sloped downward direction, the liquid, i.e., the urine, may collect in a pool within the conduit where sediment or other solid matter or debris in the liquid may deposit and collect before emptying into the external drain pipe. Typically, such a conduit is secured to a tube exiting from the urinal. While the urinal exit tube may have the desired downward slope, as at least exists in the exit tube described in U.S. Pat. No. 6,053,197 and 6,425,411, the conduit may not, due to its connection to the drain pipe or for other reasons. If permitted to rest undisturbed for a time, the deposited solid matter may bond to the conduit and, at a minimum, impede the flow, possibly creating a complete blockage. It is customary, therefore, to incline the conduit in a downward orientation towards the external drain pipe so that gravity will cause the urine to flow continuously. Such an inclined orientation is not always possible or facilely attained. For a new construction, prior planning may easily avoid a less than desired orientation. However, for older constructions where there are existing drain pipes, retrofitting of new connections, such as for new or existing urinals, whether water-free or not, may pose a problem. Existing conduits and accompanying piping may require trimming or extensions, or the urinal may have to be raised or otherwise relocated to enable the desired incline to be effected.

SUMMARY OF THE INVENTION

The present invention successfully addresses and overcomes these and other problems by use of a fitting, having an orientation, as designed to mate with the degree of slope or incline of the urinal exit tube, that provides and maintains a gravitationally downwardly-directed fluid flow director or sloped incline. The fitting is integrated with the aforementioned conduit to provide a fluid coupling of the urinal exit tube or the like with the external drain pipe. Thus, regardless of whether or not the conduit is sloped, that is, whether or not its axis is inclined similarly as that of the fitting, fluid will flow into the drain pipe.

In its preferred embodiment, the fitting comprises a bushing having an entry portion facing the urinal and an exit portion facing the drain pipe. The interior surface of the entry portion is fittable about and sealingly grips the urinal exit tube. The interiors of the entry and exit portions are coaxial with one another and substantively with the axis of the urinal exit tube. These axes define the sloped incline and, thus, a built-in, gravitationally-directed downwardly-disposed inclination. Because these axes most likely do not fall on or are parallel to the axis of the conduit, for reasons given above, they are angled and offset from the conduit axis.

The fitting also includes tubing which is secured to the bushing exit portion, which tubing extends therefrom at an incline that is determined by the built-in inclination of the bushing and the urinal exit tube. This tubing is smaller in its outer diameter than the inner diameter of the conduit so that the tubing can pass through the conduit and into the drain pipe. Further, because the tubing axis is angled to that of the conduit, to ensure that the conduit will not so contact the tubing as to deleteriously affect the downward inclination of the tubing, the bushing is provided with a facilitating structure. Accordingly, the inner surface of the bushing as coupled to the urinal exit tube is offset from the outer surface of the bushing where it is joined to the conduit. This offset raises the axis of the bushing gravitationally above that of the conduit and, likewise of the tubing where it is joined to the bushing. As the tubing progresses downward towards the external drain pipe, the tubing axis crosses that of the conduit. Thus, the tubing may be viewed as being cantilevered to the bushing. The length of the extending tubing preferably is so dimensioned that it extends beyond the end of the conduit and terminates in the drain; the aim is to provide as smooth of fluid flow into the drain as is possible. Such tubing may comprise a plurality of tubes of different lengths or a single tube that can be decreased or cut in size in size to accommodate conduits of different lengths.

An orientation indicator tab on the bushing ensures that it will be properly attached and inclined to maximize the proper slope orientation of the bushing and the attached tubing regardless of what the orientation of the conduit may be.

The exterior surfaces of the bushing are designed to enable it not only to fit within a variety of different conduits, but also to accommodate existing hardware such as flanges associated with the drain pipe, to ensure its durability, and to otherwise enable it to be retrofitted into an existing installation and new installations.

Several advantages are obtained and derived from these arrangements. The incline of the fitting, e.g., the bushing and its tubing, compensates for any less than desired existing or preexisting incline in the conduit. Enhanced gravity fluid flow into the drain pipe is assured. Deposits of sediment and other solid matter within the conduit are minimized or avoided. Collection of stagnant fluids in the conduit is also avoided.

Other aims and advantages, as well as a more complete understanding of the present invention, will appear from the following explanation of exemplary embodiments and the accompanying drawings thereof.

BRIEF DESCRIPTION OF THE DRAWINGS

FIG. 1 is a perspective view of a first embodiment of the present invention utilizing extension tubing in its longer rendition as coupled to a urinal housing that forms an enclosure for a cartridge, both of which are useful in a water-free urinal, such as is disclosed in U.S. Pat. No. 6,053,197 and 6,425,411;

FIG. 1a shows an example of a wall mounted urinal into which the enclosure of the present invention, that houses an odor trap or cartridge, can be incorporated;

FIG. 2 is a cross-sectional view of the embodiment depicted in FIG. 1;

FIG. 2a is an enlarged view of the embodiments shown in FIG. 2 taken along cutaway line 2a therein;

FIG. 3 is a perspective view of a second embodiment of the present invention as a new installation existing in the United States of America and some other countries similar to that illustrated in FIG. 1 but utilizing shorter tubing, which is likewise couplable to a housing such as shown in FIGS. 1 and 2;

FIG. 4 is an exploded view, in perspective, of the second embodiment depicted in FIG. 3;

FIG. 5 is a cross-sectional view of the embodiment depicted in FIG. 3;

FIG. 6 is an exploded view, in perspective, of a bushing assembly, the short tubing, and clamp as illustrated in FIGS. 3-5;

FIG. 7 is a cross-sectional view, in perspective, of the bushing and its short tubing, as shown in FIG. 6, but with these two elements coupled together in a latched engagement therebetween, that is, with the short tubing inserted within the bushing;

FIG. 8 is a perspective view of the long tubing as illustrated in FIGS. 1 and 2 as a replacement for the short bushing insert illustrated in FIG. 6;

FIG. 9 is a side view of the long tubing illustrated in FIG. 8;

FIG. 10 is an end view of the long tubing shown in FIG. 9;

FIG. 11 is a cross-sectional view of the long tubing taken along line 11-11 of FIG. 10;

FIG. 12 is a side view of the short tubing illustrated in FIGS. 6 and 7;

FIG. 13 is an end view of the short tubing shown in FIG. 12;

FIG. 14 is a cross-sectional view of the short tubing taken along line 14-14 of FIG. 13;

FIG. 15 is a cross-sectional view of a detail of the annular latch of the short and long tubings taken along cutaway line 15 respectively of FIGS. 10 and 14;

FIG. 16 is a perspective view of the bushing, per se, depicted in the prior figures and shown in its normally employed upright position such as shown in FIGS. 2-4;

FIG. 17 is a side view of the bushing illustrated in FIG. 16 as viewed in its normally employed upright position; FIG. 18 is a top view of the bushing illustrated in FIG. 17, but rotated 90° with respect thereto, also as viewed in its normally employed upright position;

FIG. 19 is a cross-sectional view of the bushing shown in FIG. 18 taken along line 19-19 thereof;

FIG. 20 is a view of the bushing shown in FIGS. 16-19, viewed towards its exit portion;

FIG. 21 is a front view of a detail of the bushing orientation tab taken along cutaway line 21 of FIG. 16;

FIGS. 22 and 23 are perspective front side and backside views of a retainer flange as shown in FIGS. 1, 2, 5 and 27-29;

FIG. 24 is a perspective view of a flange seal compression gasket or seal as shown in FIGS. 2, 29 and 32;

FIG. 25 is an end view of the compression gasket or seal depicted in FIG. 24;

FIG. 26 is a cross-sectional view of the compression gasket or seal taken along line 26-26 of FIG. 25;

FIG. 27 is a perspective view of a slip nut illustrated in FIGS. 3-5;

FIGS. 28-30 respectively are perspective, exploded perspective and cross-sectional views of the present invention as retrofitted into existing piping that may be found in installations existing in the United States of America and some other countries;

FIGS. 31-33 are perspective, exploded perspective and cross-sectional views of the present invention as installed into typical European-type piping; and FIGS. 34-36 respectively are perspective, exploded perspective and cross-sectional views of the present invention as installed into existing plastic piping extending, for example, from a wall.

DETAILED DESCRIPTION

As depicted in FIGS. 1, 1a and 2, a housing or collector 50 is shown for housing an odor free trap or cartridge 51a for a water-free urinal 51b. Housing 50, as described in U.S. Pat. No. 6,644,339, is provided with an exit tube or first fluid passage 52 and is coupled to an external drain pipe or second fluid passage 54 by a conduit or third passage 56, which may be an existing conduit or a replacement therefor. Exit tube 52 is inclined along an axis 52x. While a specific housing is illustrated, it is to be understood that it is the exemplar for any urinal or, more broadly, any source of fluid where the fluid is to be transported under gravity from one point, the source, to another. However, for purposes of the present exposition, housing 50 will be described as one employed for use with a water-free urinal.

Drain pipe 54 also may be an original fixture or a replacement in an existing installation. Further, while the originally intended installation of conduit 56 is that it be inclined along an axis 56x to provide a passageway for ensuring flow of fluid under the force of gravity from housing 50, the conduit may no longer be so inclined, as altered by time or replacement by another urinal or external drain pipe or otherwise. Regardless of whatever the reason, the exiting conduit and/or its gravity-directed, downwardly-disposed inclination has become suspect, that is, the inclination may have become less than the desired existing or preexisting incline in the conduit and some form of corrective action is desired or required. It is contemplated in the preferred utilization of the present invention, however, that conduit 56 remain as an attachment to drain pipe 54 and as a housing to be employed for use with the present invention. Notwithstanding, the previously existing connection of the conduit to urinal housing tube 52 is otherwise replaced by the present invention.

Accordingly, with reference particularly to FIGS. 2 and 2a, a fitting, comprising a bushing 58 and tubing or fourth fluid passage 60 secured thereto, is joined to exit tube 52 of urinal housing 50 and extends into external drain pipe 54, and preferably into or adjacent to a vertical section thereof. The fitting of bushing 58 and tubing 60 forms a gravitationally-directed downwardly-inclined fluid flow director which extends along an axis 58x towards the drain pipe. The inclination of the flow director is thus determined essentially by the downward inclination of urinal exit tube 52. As a result, tubing 60 is also provided with the same gravitationally-directed downwardly-directed inclination. As shown, tubing 60 has one end 62 joined to bushing 58 and a free-standing terminal end 64. It is preferred that terminal end 64 extends into drain pipe 54 beyond the point where the end of conduit 56 is secured to the drain pipe, to preclude the back-flow of any fluid into the conduit. Inasmuch as tubing 60 replaces conduit 56 as the wherewithal for conveyance of fluid to drain pipe 54, it needs to be imperforate so as to avoid fluid from escaping from it and thus from entering into conduit 56. Further, it is desirable that tubing end 64 so extend into the drain pipe or a connection to the drain pipe that it encourages a smooth flow thereinto as, for example, without turbulence.

Referring now to FIGS. 3-5, bushing 58 is incorporated in an alternate installation, one which is shorter than that shown in FIGS. 1 and 2 and, further, which installation depicts different hardware including a different connection between the bushing and a conduit 56a. Here, conduit 56a is shorter than conduit 56 and, like the latter, is secured to drain pipe 54. While bushing 58 is the same as in the embodiment illustrated in FIGS. 1 and 2, a tubing 60a which is shorter than tubing 60 is employed to accommodate the shorter conduit 56a. However, in a likewise manner, tubing end 62a is coupled to the bushing while tubing end 62b extends beyond the end of conduit 56a into the drain pipe with a minimum of disturbance in flow of the fluid. The fitting, comprising bushing 58 and tubing 60a secured thereto, thereby bypasses conduit 56a, so that conduit 60a will form a supplement thereto. Conduit 60a may also be construed as a director providing a coupling and inclining the supplement conduit in a gravitationally-directed downward inclination at least towards the drain pipe to assure a flow of the liquid from the exit tube to the drain pipe. Accordingly, supplement conduit as defined by tubing 60a is disposed to define a replacement liquid flow path in place of that existing conduit 56a.

Details of tubings 60 and 60a are depicted respectively in FIGS. 8-10 and 11-14, with FIG. 15 illustrating a feature which is common to both tubings. Except for their different lengths, tubings 60 and 60a are identical. Each tubing includes a latching annulus 66.

Bushing 58 is illustrated in detail in FIGS. 16-21, to which reference is now directed. The bushing includes a generally tubular entry portion or end 68 facing urinal 50 and a generally tubular exit portion or end 70 facing drain pipe 54, with a central portion 72 joining the entry and exit portions. Entry portion 68 is provided with a ribbed interior surface 74 comprising a plurality of generally equally-spaced undulating rings 76 terminating in a curved forward mouth 78. The minimum diameter of ribbed interior surface 74 is slightly smaller than the outer diameter of urinal exit tube 52. Therefore, as guided by mouth 78 when entry portion 68 is placed onto exit tube 52, bushing 58 is frictionally sealed by rings 76 in a fluid-tight engagement with the exit tube. If required, a screw/band-type or equivalent pipe clamp 80 (see FIGS. 1, 2, 5, 6, 28, 29, 31, 32, 34 and 35) may be placed about the periphery of entry portion 68 to provide a mechanical affixation in addition to the frictional engagement of the bushing to exit tube 52.

Exit portion 70 is formed with an inner recess 82 having a land or abutment surface 84 at its inner end and an annular indentation 86 at its mouth end. When tubing 60, 60a is inserted into recess 82, its end 62, 62a abuts against land 84. Also, when the tubing is fully inserted within exit portion 70, latching annulus 66 snaps into mating indentation 86 to secure the tubing firmly to bushing 58. Adjacent to land or abutment surface 84 and forming a bridge between ribbed inner surface 74 and recess 82 is an annular inwardly-directed seal 88 which, when urinal exit tube 52 is inserted within the bushing, the end of the exit tube 52 contacts seal 88 which is thus deformed to effect a fluid-tight therebetween, in addition to that formed between rings 76 and exit tube 52.

Bushing 58 is provided with an outer annular bearing 90 on its central portion 72 and, on its entry portion 68, a position indicator tab 92 with a upwardly-directed arrow and the instruction "UP" thereon. Position indicator tab 92, therefore, instructs the user to properly position the bushing both on urinal housing 50 and with respect to conduit 56.

As best shown, for example, in FIGS. 5, 7 and 19, the bushing is appropriately thickened at selected locations along its length to provide it with sufficient supporting ability, rigidity and physical strength. Such thickening is implemented by placement of zones of arced material 94 and 96 which are positioned on respectively the upper surface of entry portion 68 and the lower surface of central portion 72. In the absence of such thickening, there may be too little support material, for example, adjacent position indicator tab 92 at mouth 78. From a manufacturing point of view, such dimensioning aids in the manufacture of the bushing, e.g., during the molding process where such concerns as flow of material and shrinking are of interest. Other exterior dimensions and configurations, that is, where chamfers and topographies exist, are not critical as to the concept integral to the present invention, except as discussed immediately below, but enable bushing 58 to be adapted to existing hardware such as flanges and the like. It will be understood that the exterior dimensions and configurations of the bushing may be modified in order that the present invention may be adapted to new hardware designs.

As illustrated in FIGS. 2, 5 and 16-19, bushing axis 58x is spaced from conduit axis 56x by an offset 93, the space therebetween being depicted by arrow-headed lines 93a. At this point, for example, it is seen that the exterior surface (denoted by indicium 77) of bushing 58 at central portion 72 has an axis which coincides with conduit axis 56x (of conduits 56 and 56a). This offset raises the tubing at its end 62, 62a slightly above conduit axis 56x. Thus, because the tubing diameter is smaller than the of the conduit, the tubing will pass through the interior of the conduit without contacting its inner surface and, therefore, will not have it inclination displaced. This feature is especially significant with respect to longer tubing 60 as shown in FIG. 2.

In accordance with the foregoing considerations relating to the exterior dimensions and configurations of the bushing, reference is now directed to FIGS. 1-5 and 22-36 which depict employment of the present invention with existing installations. As more particularly illustrated in FIGS. 1, 2, 2a, 22-26 and 30, a compression gasket 100 (see also FIGS. 24-26) having a ringed sealing surface 102 and an annular opening 104 is placed over entry portion 68 and onto central portion 72 of the bushing and into contact with bushing annular bearing 90. With compression gasket 100 housed within recess 108 of exit flange 106, seals are established with urinal support flange 98 and annular bearing 90. When flange 106 is joined with urinal support flange 98 (see also FIGS. 28-30), compression seal 100 is pressed into sealing engagement with the urinal support flange. Bolt-receiving holes 110 in the flange permit the flange to be secured to additional hardware (e.g., urinal support flange 98 shown in FIGS. 28 and 29) and also to secure the conduit thereto. Such a urinal support flange includes bolts 114 to which nuts 116 are threadedly engaged. Washers 118 are placed under nuts 116 and about bolts 114. This connection also secures urinal exit tube 52 to bushing entry and central portions 68 and 72. Thereafter, clamp 80 may be secured about entry portion 68 of the bushing for lending insurance, as may be required by governmental regulations, to provide further mechanical attachment.

Alternately, as depicted in FIGS. 3-5, a nut 120 (see also FIG. 27) is placed directly against annular bearing 90 and screwed onto conduit 56a to seal bushing 58 thereto. Here, nut 120 is placed about central portion 72 adjacent entry portions 68 and into contact with annular bearing 90. When nut 120 is threaded onto conduit 56a, annular bearing 90 is compressed to for a sealing engagement therewith.

FIGS. 31-33 illustrate a further connection, here to a plastic elbow fitting 54a that leads to a drain pipe. Elbow 54a is provided with an entry 122 having an annular recess 124 which is disposed to hold and press a compression gasket or seal 126 onto exit portion 70 of bushing 58. An end 128 of entry 122 acts as a stop against which and to which bushing annular bearing 90 is sealed.

FIGS. 34-36 depict a still further connection, one comprising a drain pipe 54b, such as a plastic pipe protruding from a wall, whose end sealingly abuts against annular bearing 90 of bushing 58.

Accordingly, although the invention has been described with respect to particular embodiments thereof, it should be realized that various changes and modifications may be made therein without departing from the spirit and scope of the invention.

What is claimed is:

1. A mechanism for improving liquid flow from a collector of liquid to a drain pipe, comprising:
    an exit tube terminating the collector of liquid and directed towards the drain pipe;
    a conduit normally and fixedly coupled to and between the exit tube and to the drain pipe and normally providing a flow path for the liquid to the drain pipe along a conduit axis;
    wherein both the liquid collector and the drain pipe via the conduit are fixed in place relative to themselves and to one another, and when there exists a misalignment of the conduit and its axis with respect to the drain pipe such that the flow path is less than being in a sufficiently sloped downward direction that would otherwise enable intended flow of the liquid into the drain pipe;
    a fitting rigidly coupled to the conduit and to the exit tube, including imperforate structure, bypassing the conduit and extending towards the drain pipe, said fitting including a structural director which is coupled to said imperforate structure, which has a configuration and associated axis which is different from that of the conduit and which provides a gravitationally-directed downward inclination to said imperforate structure and, thereby, to the fluid flow within said imperforate structure and, consequently, a rectification of the misalignment which inclination is axially inclined essentially as that provided by the exit tube, thereby assuring the intended flow of the liquid into the drain pipe.

2. A mechanism according to claim 1 in which said gravitationally-directed downwardly-inclined fluid director includes a bushing housed within the conduit and providing the gravitationally-directed downwardly-directed inclination.

3. A mechanism according to claim 2 in which said tubing terminates in the drain pipe.

4. A mechanism according to claim 3 in which the length of said tubing is capable of being dimensioned vis-a-vis the length of the conduit for enabling it to extend beyond the end of the conduit and thus terminate in the drain pipe.

5. A mechanism according to claim 3 in which said bushing has an entry portion and an exit portion facing the drain pipe, and said entry and exit portions include a built-in gravitationally-directed downwardly-inclined inclination which is essentially the same inclination as that provided by the exit tube and which establishes said gravitationally-directed downwardly-inclined fluid flow director to which said tubing is secured and, thereby, by which said tubing is provided with its inclination, wherein the incline of the inclination thus compensates for any less than desired existing or preexisting incline in the conduit.

6. A mechanism according to claim 5 in which said tubing has a diameter which is smaller than that of the conduit for enabling it to pass therethrough and into the drain pipe.

7. A mechanism according to claim 6 in which said entry portion of said bushing has an off-axis interior surface whose center line is gravitationally higher than that of the conduit so that said tubing extending therefrom is enabled to pass into and through the conduit without substantial contact therewith.

8. A mechanism according to claim 7 in which the collector comprises a urinal, the conduit is secured to the drain and to the urinal having the exit tube, and said off-axis interior surface of said bushing is fittable about and sealingly grips the exit tube.

9. A mechanism according to claim 8 in which the urinal comprises a water-free urinal and said collector comprises a water-free cartridge fittable into the urinal.

10. A mechanism according to claim 8 further including an orientation indicator on said bushing to ensure that its inclined orientation is seen by a user that it is properly positioned vis-a-vis the conduit.

11. A mechanism according to claim 8 in which said off-axis interior surface of said bushing comprises a ribbed construction for enabling a proper liquid-tight seal with the urinal piping, and said ribbed interior surface is angled similarly to that of the urinal piping.

12. In a collector of liquid terminating in an exit tube directed towards a drain pipe and a conduit having two ends, a first end coupled to the exit tube and a second end coupled to the drain pipe and normally providing a flow path for the liquid to the drain pipe, wherein both the liquid collector and the drain pipe are fixed in place relative to themselves and to one another, a method for improving liquid flow through the conduit to the drain pipe, especially when the axes of the conduit and the drain pipe are not mutually aligned, comprising the steps of separately directing a gravitationally-directed downwardly-inclined fluid flow within the conduit, but separately from that in contact with the conduit, coupling a fitting to the conduit, extending the fitting towards the drain pipe, and providing the fitting with a director for furnishing a gravitationally-directed downwardly-inclined fluid flow.

13. A method according to claim 12 further comprising the step of terminating the flow in the drain pipe.

14. A method according to claim 12 in which tubing is utilized for said step of separately directing a gravitationally-directed downwardly-inclined fluid flow within the conduit, further comprising the step of dimensioning the length of the tubing so as to be capable of being dimensioned vis-a-vis the length of the conduit for enabling the tubing to extend beyond the end of the conduit and thus terminate in the drain pipe.

15. A method according to claim 14 further comprising the step of utilizing a fitting with an off-axis interior surface whose center line is gravitationally higher than that of the conduit so that the tubing extending therefrom is enabled to pass into and through the conduit without substantial contact therewith.

16. A method according to claim 15 further including the steps of utilizing a bushing as the fitting and orienting the bushing to ensure that its inclined orientation is seen by a user that it is properly positioned vis-a-vis the conduit.

17. A mechanism for improving liquid flow from a collector of liquid [50] to an exit [54], comprising:
    a first fluid passage [52] extending from the collector of liquid [50] having an inclination directed downwardly towards the exit which defines a second fluid passage [54] along a first fluid passage axis [52x] and a third passage [56] having a third passage axis [56x] normally intended to rigidly couple the first [52] and second [54] passages together and normally intended to provide a flow path for the fluid from the first passage [52] to the second [54] along the third passage axis [56z], and when both the first third [56] and second [54] passages are each fixed in their respective places and to one another and when the third passage [56] has a preexisting misalignment relative to the second passage [54] with the result that the flow of the fluid is directed in a less than desired direction into the second fluid passage [54];

a fitting [58 +60] adapted to ensure a desired alignment and rectification of the first [52] and second [54] passages and a more desired fluid flow into the second passage [54];

a bushing [58] having interior [82] and exterior [82] surfaces which are defined by non-parallel axes [58x, 56x], said interior surface [82] terminating respectively in first [68] and second [70] interior surface ends, with said first interior surface end [68] adapted to be coupled to the first passage [52] to define the first [52x] of the non-parallel axes;

a fourth passage [60] which is coupled to said second bushing interior surface end [70], which extends within the third passage [56], and which has an axis that is coaxial with the first axis [52x]; and wherein said bushing exterior surface [77] is adapted to be coupled to the third passage [56] and in which one [52x] of the non-parallel axes rectifies the misalignment, for which any less than the preexisting misalignment is compensated.

18. A mechanism according to claim 17 in which said bushing interior and exterior surfaces have circular configurations for enabling said bushing to be rotated with respect to the first and second passages.

19. A mechanism according to claim 17 in which said interior surface of said bushing comprises a ribbed construction for enabling a proper liquid-tight seal with the first passage, and said ribbed interior surface is angled similarly to that of the first passage.

20. A mechanism for improving liquid flow from a collector of liquid to a drain pipe, comprising:

an existing conduit which rigidly connects the drain pipe to an exit tube that terminates the collector of liquid, wherein both the liquid collector exit tube and the drain pipe are each fixed in their respective places and to one another and wherein the existing conduit is disposed to define a flow path for the liquid and when the flow path is less downwardly sloped than would otherwise enable a desired flow of the liquid into the drain pipe;

an imperforate supplement conduit positioned within the existing conduit;

a coupling coupling said supplement conduit to said exit tube, wherein said supplement conduit is disposed to define a replacement liquid flow path in place of that of the existing conduit; and said coupling having a structural director and configured by said director which inclines said supplement conduit in a gravitationally-directed downward inclination at least towards the drain pipe which inclination is different from the less downwardly sloped flow path, wherein the gravitationally-directed inclination of said supplement conduit provides an improved gravitationally-directed inclination from that of the existing conduit to assure a flow of the liquid from the exit tube to the drain pipe, thereby assuring the desired flow of the liquid into the drain pipe.

21. A fitting for coupling a downwardly sloping exit tube (52) which exit tube has an exterior surface and which exit tube extends along a first axis (52x) from a sanitary appliance to a conventional drain conduit (56) which drain conduit has an interior surface and which drain conduit extends generally horizontally along a second axis (56x) into an existing drain pipe (54), the first axis being tilted downwardly relative to the second axis, said fitting comprising:

a bushing (58) adapted to couple the exit tube to the drain conduit and having a generally tubular entry portion (68) defining an external surface of said bushing which is adapted to be maintained in fluid tight engagement with the interior surface of the drain conduit in alignment with said second axis, said entry portion both having an interior surface (74) for maintaining said bushing in a fluid tight engagement with an exterior surface of the exit tube and defining an exterior bushing axis, and a generally tubular exit portion (70) extending rearwardly from said interior surface; and a tubing assembly (60) having a first end (62) in fluid tight engagement with said tubular exit portion of said bushing and a terminal end (64), said tubing assembly being adapted to extend downwardly from said bushing into the drain pipe, wherein said interior surface of said tubular entry portion defines an interior bushing axis that is offset above and downwardly sloped towards the exterior bushing axis defined by said tubular entry portion, whereby when said bushing is operatively positioned between the exit tube from the sanitary appliance to the conduit leading to the drain pipe, said interior surface is oriented about the first axis defined by the exit tube, and said external surface of said bushing is oriented about the second axis defined by the conduit.

22. The fitting of claim 21, further comprising a flange assembly (98, 106) for mechanically securing the sanitary appliance to the conduit.

23. The fitting of claim 22, wherein said flange assembly further comprises a compression gasket (100) adapted to be placed over said external surface of said bushing.

24. The fitting of claim 23, wherein said compression gasket is sandwiched between a urinal support flange (106) mechanically coupled to the urinal and an exit flange 98 screwed onto a threaded end of the conduit.

25. The fitting of claim 21, in which said interior surface of said bushing is ribbed.

26. A mechanism for improving liquid flow from a urinal to a drain pipe comprising:

a collector of liquid terminating in an exit tube directed towards a drain pipe and a conduit normally and fixedly coupled to and between the exit tube and to the drain pipe and normally providing a flow path for the liquid to the drain pipe along a conduit axis, wherein both the liquid collector and the drain pipe via the conduit are fixed in place relative to themselves and to one another, wherein there exists a misalignment of the conduit and its axis with respect to the drain pipe such that the flow path slope is less than in a sufficiently sloped downward direction that would otherwise enable intended flow of the liquid into the drain pipe, and a fitting rigidly coupled to the conduit and to the exit tube, including imperforate structure, bypassing the conduit and extending towards the drain pipe, said fitting including a structural director which is coupled to said tubular structure, which has a configuration and associated axis which is different from that of the conduit and which provides a gravitationally-directed downward inclination to said tubular structure and, thereby, to the fluid flow within said tubular structure and, consequently, a rectification of the misalignment which inclination is axially inclined essentially as that provided by the exit tube, thereby assuring the intended flow of the liquid into the drain pipe.

\* \* \* \* \*